United States Patent
Cole (10) Patent No.: US 8,484,279 B1
(45) Date of Patent: Jul. 9, 2013

(54) SYSTEM AND METHOD OF DISTRIBUTED COMPUTING USING EMBEDDED PROCESSORS

(75) Inventor: Joshua R. Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 599 days.

(21) Appl. No.: 12/696,264

(22) Filed: Jan. 29, 2010

(51) Int. Cl.
  *G06F 15/16* (2006.01)
(52) U.S. Cl.
  USPC ............. 709/201; 718/105; 718/104
(58) Field of Classification Search
  USPC ............. 709/201; 718/100, 102, 104, 105
  See application file for complete search history.

(56) References Cited

U.S. PATENT DOCUMENTS

| | | | |
|---|---|---|---|
| 7,515,899 B1 | 4/2009 | Carr et al. | |
| 7,797,705 B2 * | 9/2010 | Oka | 718/104 |
| 7,941,805 B2 * | 5/2011 | Dillenberger et al. | 718/105 |
| 8,108,875 B2 * | 1/2012 | Dillenberger et al. | 718/104 |
| 2004/0205759 A1 * | 10/2004 | Oka | 718/102 |
| 2008/0046895 A1 * | 2/2008 | Dillenberger et al. | 718/105 |
| 2008/0178192 A1 * | 7/2008 | Dillenberger et al. | 718/105 |
| 2009/0222824 A1 | 9/2009 | Little | |

* cited by examiner

*Primary Examiner* — Kenneth R. Coulter (57) ABSTRACT

A method of distributed computing is provided. The method comprises establishing a network of processors, wherein the processors are associated with a plurality of classes and wherein at least some of the processors are embedded in portable electronic devices, and partitioning a problem to be solved by the network of processors into a plurality of problem segments, wherein the problem segments are associated with the plurality of classes associated with the processors. The method further comprises transmitting the problem segments to the processors based on the class of each processor, receiving partial solutions from the processors, and analyzing the partial solutions. An aspect of the method may comprise defining the classes based on at least one of a processor class, a data communication quality of service, and a responsibility level of the processor.

19 Claims, 7 Drawing Sheets

SYSTEM AND METHOD OF DISTRIBUTED COMPUTING USING EMBEDDED PROCESSORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some automated problems consume a great amount of computing power while processing data to arrive at a solution. For example, the processing of large amounts of radio frequency energy received from extra terrestrial sources by the search for extra terrestrial intelligence (SETI) project to determine if there are any intelligent signals mingled in with the radio data consumes a great amount of computing power. One approach to solve these large automated problems is to partition the problem into a number of smaller problems which can be delegated to a plurality of computers to solve. After the computers solve the smaller problems, the partial solutions are collated and analyzed to complete the solution. This approach to automated processing may be referred to as distributed computing.

SUMMARY

In an embodiment, a method of distributed computing is disclosed. The method comprises establishing a network of processors, wherein the processors are associated with a plurality of classes and wherein at least some of the processors are embedded in portable electronic devices, and partitioning a problem to be solved by the network of processors into a plurality of problem segments, wherein the problem segments are associated with the plurality of classes associated with the processors. The method further comprises transmitting the problem segments to the processors based on the class of each processor, receiving partial solutions from the processors, and analyzing the partial solutions.

In an embodiment, another method of distributed computing is disclosed. The method comprises establishing a network of processors, wherein the processors are associated with a plurality of classes of service, each class of service defined based on a processor class and a data communication quality of service, and partitioning a problem to be solved by the network of processors into a plurality of segments, wherein some of the segments are directed to batch processing of data and some of the segments are directed to administrative tasks associated with managing a process of solving the problem. The method further comprises transmitting the segments directed to batch processing of data to a first group of the processors based on the processor class of the processors in the first group and transmitting the segments directed to administrative tasks to a second group of the processors based on the class of each processor in the second group. The method further comprises receiving partial solutions from the processors and analyzing the partial solutions.

In an embodiment, another method of distributed computing is disclosed. The method comprises establishing a network of processors, wherein the processors are associated with a plurality of classes based at least in part on a responsibility class of the processor, wherein at least some of the processors are embedded in portable electronic devices, and partitioning a problem to be solved by the network of processors into a plurality of problem segments based at least in part on different levels of responsibility classes, wherein the problem segments are associated with the plurality of classes associated with the processors. The method further comprises transmitting the problem segments to the processors based on the class of each processor, receiving partial solutions from the processors, and solving the problem based on the partial solutions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

It is a teaching of the present disclosure that embedded processors, for example a central processing unit (CPU) and/or a digital signal processor (DSP) embedded in a mobile phone, may be idle a significant amount of time and comprise an untapped computing resource. Significant and valuable processing of data may be accomplished by establishing a network of embedded processors, partitioning the processing of the data into a plurality of different types of processing segments that are scoped to be suitable to the large range of processing capabilities of embedded processors, distributing the processing segments to these embedded processors each according to their processing capabilities, receiving the partial solutions from these processors, and determining a result from the partial solutions. The value of this computing resource will continue to grow as the processing power of embedded processors continues to increase and as processors are embedded in more and more devices. Because many embedded processors are now provided with communication networking capabilities, it is now becoming feasible to tap into this valuable computing resource and use them for distributed computing.

The present disclosure teaches establishing a network of processors, for example embedded processors, and relying upon the network of processors to perform distributed computing tasks during idle time of the processors. Some of the contemplated processors include processors embedded in portable electronic devices, printers, copiers, facsimile machines, entertainment electronics, household appliances, and other devices. A distribution server may break a task and/or problem suitable for automated processing into a variety of different sized sub-tasks and/or problem segments that may be suitable for distributing to different embedded processors for processing. The media access gateway (MAG) or other server computer in communication with the distribution server may assign the sub-tasks and/or problem segments to the embedded processors based on the processing capacity of the processors, based on a responsibility level and/or mission criticality of the processors, and/or based on a data communication facility coupled to the processor. The processors perform sub-task and/or the problem segment that is assigned to them and return their results to the media access gateway or other server computer. In some contexts these results may be referred to as partial solutions.

The process of transmitting sub-tasks and/or problem segments to the embedded processors, the embedded processors performing the sub-tasks and/or the problem segments and returning the results and/or partial solutions to the media access gateway or distribution server may iterate multiple times. In some cases, the iteration may continue over an extended period of time, for example over a month-long period of time to complete a billing task or over multiple years to complete a complex data processing task associated with a complex scientific research project. The media access gateway and/or the distribution server may then aggregate the plurality of partial solutions to arrive at a solution to the problem. Depending upon the task to be performed and/or the problem to be solved, the media access gateway and/or distribution server may aggregate the plurality of partial solutions occasionally and/or periodically to determine interim, provisional, or incomplete solutions. In some cases, a problem solution may not be arrived at or a deterministic problem solution is not the objective of the processing in the first place.

In an embodiment, the media access gateway may monitor the turnaround time of processors associated with a high responsibility level or having mission critical functionality and when the turnaround time drops below a predefined threshold, the media access gateway may reduce the load it places on the subject processors. The processors may return indications of their processing burden when they return their partial results and/or their partial solutions to the media access gateway. For example, the processors may determine an average processor utilization rate during the time they were determining their partial results and/or their partial solutions and send this average processor utilization rate along with the partial results and/or partial solutions to the media access gateway. The media access gateway may modulate the frequency that it sends additional sub-tasks and/or problem segments to the processor based on the average processor utilization rate. The media access gateway may select the class of sub-tasks and/or problem segments to the processor based on the average processor utilization rate. As the load on the processor varies over time, for example as the load on a processor in a printer providing printer functionality varies between working hours of an office during the day versus evening hours and weekend hours, the media access gateway adjusts the frequency of sending sub-tasks and/or problem segments to the processor and/or adjusts the class of sub-tasks and/or problem segments sent to the processor.

Figure 1:
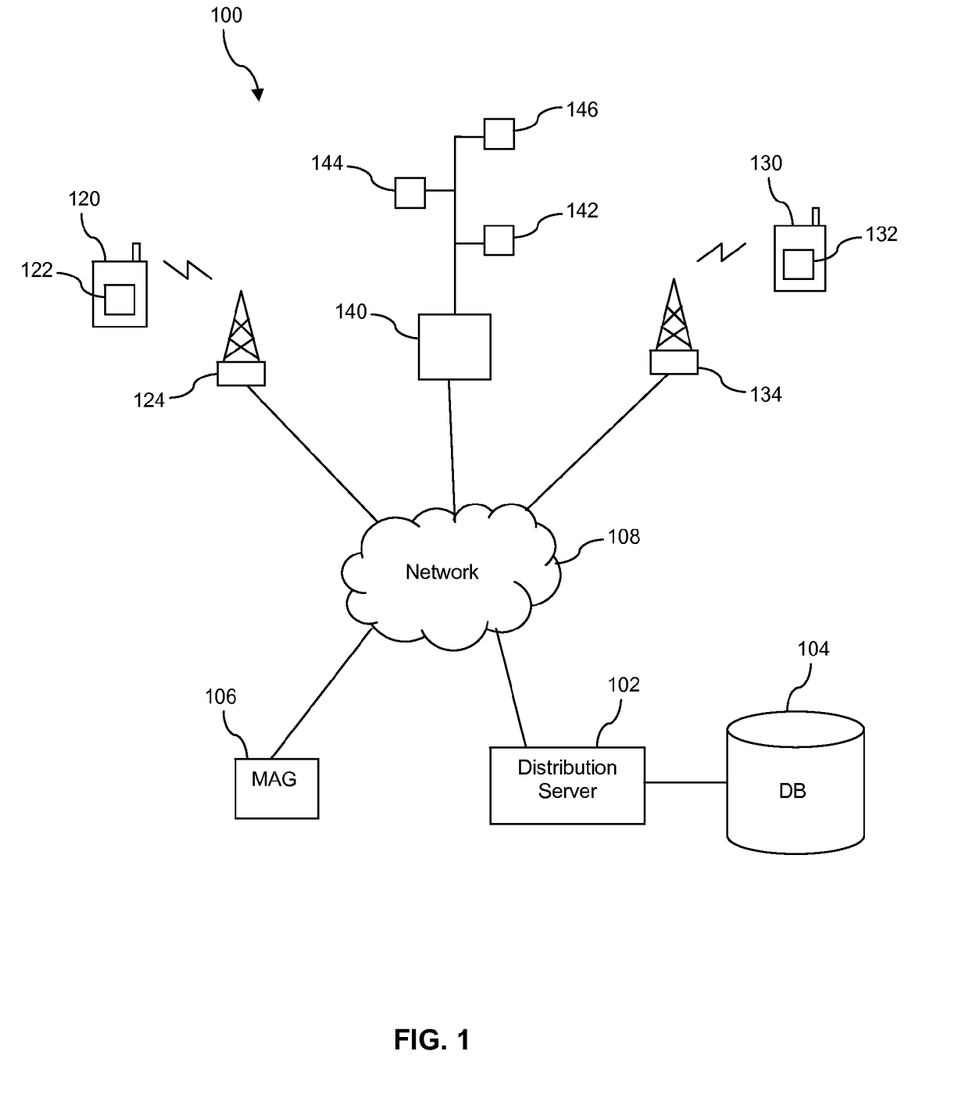
FIG. 1 is an illustration of a system according to an embodiment of the disclosure.

Turning now to FIG. 1, a system 100 for distributed computing using embedded processors is described. The system 100 may comprise a distribution server 102 coupled to a data store 104, and a media access gateway (MAG) 106. The media access gateway 106 and the distribution server 102 may communicate via a network 108. The network 108 may comprise a public communication network, a private communication network, or a combination thereof. The network 108 or portions of the network 108 may comprise the Internet. The media access gateway 106 communicates through the network 108 with a first portable electronic device 120 via a first base transceiver station (BTS) 124 and communicates with a second portable electronic device 130 via a second base transceiver station 134. In another embodiment, however, the system 100 may not comprise the media access gateway 106 or the functionality of the media access gateway 106 may be provided by the network 108. The first portable electronic device 120 comprises a first embedded processor 122, and the second portable electronic device 130 comprises a second embedded processor 132.

The first base transceiver station 124 provides a wireless communication link and connectivity therethrough to the network 108 to the first portable electronic device 120, while the second base transceiver station 134 provides a wireless communication link and connectivity therethrough to the network 108 to the second portable electronic device 130. The wireless communication links may be provided based on one or more wireless communication protocols comprising code division multiple access (CDMA), global system for mobile communications (GSM), long-term evolution (LTE), worldwide interoperability for microwave access (WiMAX), WiFi, Bluetooth, and other telecommunication protocols. At least part of the wireless communication links may comprise high speed data communication links, for example, 1 times radio transmission technology (1x-RTT), evolution-data optimized (EV-DO), high speed packet data (HSPD), and other high speed data communication protocols. It is contemplated that femtocells and/or access points may provide wireless communication links to the portable electronic devices 120, 130 in some circumstances. While the portable electronic devices 120, 130 are depicted in FIG. 1 as in wireless communication with only one base transceiver station 124, 134, it is understood that the portable electronic devices 120, 130 may be in wireless communication with more than one base transceiver station 124, 134 at one time. Additionally, it is understood that over time the portable electronic device 120, 130 may move their locations and establish wireless communication links through different base transceiver stations.

The system 100 may further comprise a computer 140 coupled to the network 108 and a local area network (LAN) in communication with the computer 140 comprising a third embedded processor 142, a fourth embedded processor 144, and a fifth embedded processor 146. While in FIG. 1 the local area network is illustrated as comprising three embedded processors 142, 144, 146, it is understood that the local area network may comprise fewer or additional embedded processors. The communication link between the computer 140 and the local area network may be a wired link and/or a wireless link. It is understood that the system 100 may further comprise additional computers like computer 140 coupled to the network 108 and to a local area network comprising embedded processors. Additionally, it is understood that the system 100 may comprise embedded processors that may be directly coupled to the network 108.

The local area network may be located in a home or private residence, and the embedded processors 142, 144, 146 may be embedded in entertainment devices, home appliances, and other devices that embed processors. For example, the processors may be embedded in televisions, refrigerators, ovens, microwave ovens, toasters, dishwashers, freezers, clothes washers, clothes dryers, and other devices that embed processors. Alternatively, the local area network may be located in a business or organization, and the embedded processors 142, 144, 146 may be embedded in printers, copiers, facsimile machines, refrigerators, microwaves, computer numerical controlled (CNC) machines, heating ventilation and air conditioning (HVAC) controllers, telephone customer premises equipment (CPE), and other devices that embed processors.

As used herein, the term 'embedded processor' refers to an electronic processing unit—for example a central processing unit (CPU), a digital signal processor (DSP), an application specific integrated circuit (ASIC), a field programmable gate array (FPGA), a complex programmable logic device (CPLD), a micro controller, and other like semiconductor devices—that forms a part of a larger electro-mechanical system and provides control and/or monitoring functionality to that electro-mechanical system. In some contexts, the 'embedded processor' may be said to be 'embedded' inside of or within the subject electro-mechanical system. For example, a central processing unit and/or a digital signal processor unit may be said to be embedded in a mobile phone that further comprises a radio, a display, push-buttons and/or touchscreen, and other electro-mechanical elements. As another example, a central processing unit, a digital signal processor, a micro controller, and/or other electronic processing unit may be said to be embedded in a refrigerator that further comprises a door, light switches, a compressor, an expansion coil, a heat exchanger, and other electro-mechanical elements.

Data processing tasks, which may also be referred to generally as problems or automated problems, that are suitable to distributed computing may be drawn from a variety of sources including the scientific community, the financial services community, the information archiving space, and social services community including government services. In some contexts, these data processing tasks may be referred to as problems or automated problems. In some cases, the distributed computing contemplated by the present disclosure may be provided on a paid basis by a distributed computing service company. The distributed computing service company may negotiate with owners of the embedded processors to rely upon their processors to perform distributed computing and may receive fees from the data processing community for providing the distributed computing services. In an embodiment, the distributed computing service company may be a division of a wireless communication service provider, and the wireless service provider may provide incentives to wireless service subscribers to consent to the wireless service provider using the idle time of the embedded processors 122, 132 embedded in their portable electronic devices 120, 130. These incentives may include free wireless communication minutes, reduced cost service plans, enhanced data plans, and other like incentives.

The data processing task and/or problem may be provided to the distribution server 102 and stored in the data store 104. The distribution server 102 may partition the task and/or problem into a plurality of sub-tasks and/or problem segments that are suitable for distributed processing and/or distributed computing. In some contexts, the task segments and/or problem segments may be referred to as particles, problem particles, and/or task particles. The distribution server 102 may store the problem segments in the data store 104, pending distributing these problem segments to embedded processors, for example to embedded processors 122, 132, 142, 144, 146. The distribution server 102 may partition the problem based on a plurality of processor classes.

The processor classes may be employed to take account of the different distributed computing loads that different processors are able to handle and to scale the problem segments accordingly. Additionally, the loading on the different processors may be taken into consideration to assign problem segments to processors accordingly, for example assigning simpler and/or smaller problem segments and/or sub-tasks to relatively more heavily loaded processors and assigning more complex and/or larger problem segments and/or sub-tasks to relatively more lightly loaded processors. The processors may track their loading, for example central processor utilization rate, over time, determine their average loading over a unit of time, and send this average loading to the media access gateway 106 and/or the distribution server 102.

The processor classes may be determined based on one or more of processing capability, average processor loading, processor responsibility level, and communication availability associated with the processors. Those skilled in the art appreciate that different processors exhibit a wide range of different processing power. Different processors may support different instruction sets making them more efficient at some types of problem solving and less efficient at other types of problem solving. Different processors may have different processing speed, for example they may support different numbers of instructions per unit time (i.e., different numbers of MIPS—millions of instructions per second). Processor speed, instruction set strengths, and other processor features may be used to determine the processor capability.

Processors embedded in some devices and/or electro-mechanical systems may have greater or less critical responsibility. For example, the processor in a microwave oven may be considered to have a low level of responsibility, but a processor embedded in a security system may be considered to have a high level of responsibility. An expected response time of a processor may factor into the responsibility level associated with the processor. For example, a processor that is expected to provide real-time response may be considered to have a higher responsibility level than a different processor that has a more relaxed response time expectation. It is contemplated that there may be a range of different levels of responsibility that may be reflected in the processor classes.

Processors embedded in different devices may be associated with different levels of communication availability. Communication availability may be based in part on a data throughput capability. Additionally, communication availability may be based in part on a history of communication link availability. For example, the portable electronic device 130 may be provided with a high throughput data service plan but the portable electronic device 130 may often be located in a mountainous area where the communication link with the base transceiver station 134 is intermittent or strongly dependent on the location of the portable electronic device 130. A history of communication availability may be accumulated and analyzed to determine an average communication availability, an average communication bandwidth availability, or some other communication availability figure of merit that may be used to determine suitable problem segments to send to the associated processors.

In an embodiment, the distribution server 102 may send a problem segment to the media access gateway 106 along with an indication of the processor class that the problem segment is associated with. The media access gateway 106 may maintain a list of embedded processors 122, 132, 142, 144, 146 that have consented to participating in distributed computing as well as a processor profile for each of the embedded processors 122, 132, 142, 144, 146. The processor profile may define the processor capability, the processor responsibility level, the communication availability, and other operating parameters of the subject processor. The processor profile, or another data structure, may define one or more time intervals during which the subject processor is available for participation in distributed computing activities. The media access gateway 106 distributes the problem segments to the embedded processors 122, 132, 142, 144, 146 based on the indication of the processor class and based on the processor profiles. Alternatively, in another embodiment, the distribution server 102 may maintain the list of embedded processors 122, 132, 142, 144, 146 and the processor profiles, and the distribution server 102 may distribute the problem segments to the embedded processors 122, 132, 142, 144, 146 via the network 108 based on the indication of the processor class and based on the processor profiles.

The problem segments and/or sub-tasks may be queued up, by either the media access gateway 106 or the distribution server 102, for sending to the embedded processors 122, 132, 142, 144, 146 when a data communication session is established between the embedded processor 122, 132, 142, 144, 146 and the network 108 and when the data communication session may be idle. For example, the media access gateway 106 may queue a problem segment for sending to the first embedded processor 122 until the media access gateway 106 determines that the first portable electronic device 120 has an active data communication session established and this data communication session is temporarily idle. An application on the media access gateway 106 may be dedicated to monitoring the data sessions of the embedded processors 122, 132, 142, 144, 146 to identify and exploit such communication link idle times. This approach to transmitting problem segments during idle time of data communication sessions may promote conserving a limited energy reserve of the battery of the portable electronic device 120. Alternatively, the media access gateway 106 may initiate a data communication session when desired to send problem segments and/or sub-tasks to the embedded processors 122, 132, 142, 144, 146.

The problem segments and/or sub-tasks may comprise data to be processed as well as instructions for how to process the data. The instructions may comprise executable instructions which the embedded processors 122, 132, 142, 144, 146 may execute directly or byte code which the embedded processors 122, 132, 142, 144, 146 may first interpret and then execute. Alternatively, the instructions may provide a general description or indication of how the data is to be processed, and a distributed computing client executing on the embedded processors 122, 132, 142, 144, 146 may process the data based on the indication of how the data is to be processed.

The embedded processors 122, 132, 142, 144, 146 accordingly process the problem segments and/or sub-tasks during idle time, each generating partial solutions of the problem to be solved and/or partial results for the data processing task that is to be completed. As used herein, the term idle time on the embedded processor 122, 132, 142, 144, 146 means that the processor is not currently scheduled to execute another task, for example one of the primary tasks and/or functions for which the processor 122, 132, 142, 144, 146 is embedded in an electro-mechanical system. It is understood that modern processors, such as the embedded processors 122, 132, 142, 144, 146, may execute a plurality of applications in a conceptually concurrent manner by scheduling the several applications in turn and changing context of the embedded processor 122, 132, 142, 144, 146 from one application to the next. A scheduler application or operating system scheduler may grant processor time to the several applications as needed and/or on a prioritized basis. When none of these one or more other applications is scheduled by the scheduler application and/or operating system to execute instructions at the current time, the processor may be said to be idle, notwithstanding that one or more applications may be said to be executing and/or active.

The embedded processors 122, 132, 142, 144, 146 then transmit the partial solutions and/or partial results back to the media access gateway 106 and/or to the distribution server 102. In an embodiment, the embedded processors 122, 132, 142, 144, 146 may queue the partial solutions for transmitting to the media access gateway 106 and/or to the distribution server 102 using idle time of an established data communication session. In another embodiment, the embedded processors 122, 132, 142, 144, 146 may queue the partial solutions for transmitting to the media access gateway 106 and/or to the distribution server 102 on the event of closing and/or disconnecting an established data communication session, transmitting the partial solutions before the data communication session is terminated. In another embodiment, the embedded processors 122, 132, 142, 144, 146 may establish a data communication session expressly for the purpose of transmitting the partial solutions once they have been prepared to the media access gateway 106 and/or to the distribution server 102. This process may be repeated iteratively.

A distributed client may be installed in a memory coupled to the embedded processors 122, 132, 142, 144, 146 to promote the distributed computing. The distributed client may be downloaded to the memory coupled to the embedded processors 122, 132, 142, 144, 146 when the owners of the embedded processors 122, 132, 142, 144, 146 consent to the distributed computing. Alternatively, the distributed client may be installed on the devices in which the embedded processors 122, 132, 142, 144, 146 are embedded when these devices are manufactured and/or provisioned for use. The distributed client may provide feedback to the distributed server 102 and/or media access gateway 106 that may be used to determine what problem segments to transmit to the embedded processors 122, 132, 142, 144, 146. For example, the distributed client executing on the first embedded processor 122 may determine that the battery power reserve of the first portable electronic device 120 is low and send this information to the media access gateway 106. In response, the media access gateway 106 may not send further problem segments to the first embedded processor 122 until an update message from the first portable electronic device 120 indicates that the battery power reserve of the first portable electronic device 120 is charged above a predefined threshold level, for example charged above a half power reserve or half energy reserve capacity. Alternatively, the media access gateway 106 may continue to transmit problem segments to the first embedded processor 122 after learning that the battery power reserve of the first portable electronic device 120 is low but at a slower pace, for example by inserting time delays between receipt of a partial solution and the next transmission of a problem segment. Alternatively, the media access gateway 106 may transmit problem segments to the first embedded processor 122 if the media access gateway 106 has learned that the first portable electronic device 120 is connected to a power supply even if battery power reserve of the first portable electronic device 120 is low.

The distributed client may also respond to requests from one of the media access gateway 106 and/or the distribution server 102 to measure a time of reception of a block of data and report back the time elapsed during reception. The distributed client may respond to requests from one of the media access gateway 106 and/or the distribution server 102 to transmit a block of data to the media access gateway 106 and/or the distribution server 102, and the subject media access gateway 106 and/or the distribution server 102 may measure an elapsed time associated with receiving the block of data. The media access gateway 106 and/or the distribution server 102 may determine a downlink communication bandwidth and/or an uplink communication bandwidth based on these elapsed times. The downlink and/or uplink communication bandwidth may be used to characterize the subject embedded processor 122, 132, 142, 144, 146, for example by including this information in the associated processor profile. In turn, the downlink and/or uplink communication bandwidth of the embedded processors 122, 132, 142, 144, 146 may be used to determine the type of problem segment to transmit to the subject embedded processors 122, 132, 142, 144, 146.

The media access gateway 106 may monitor the loading and/or burden on the embedded processors 122, 132, 142, 144, 146 to modulate the frequency that additional problem segments are sent to the embedded processors 122, 132, 142, 144, 146 as well as to modulate the class of problem segments sent to the embedded processors 122, 132, 142, 144, 146. For example, each processor may determine a ratio of idle time to busy time over a unit of time, which may be referred to as average load and/or average utilization, and return the ratio of idle time to busy time with partial solutions and/or partial results to the media access gateway 106. The media access gateway 106 may maintain a history of average utilization for each embedded processor 122, 132, 142, 144, 146 and use this history in assigning problem segments and/or sub-tasks to the processors. For example, when the history of a processor indicates that it has an average utilization rate of 80% weekdays from 8 AM to 5 PM, the media access gateway 106 may not send any problem segments and/or sub-tasks to the subject processor weekdays from 8 AM to 5 PM.

Figure 2:
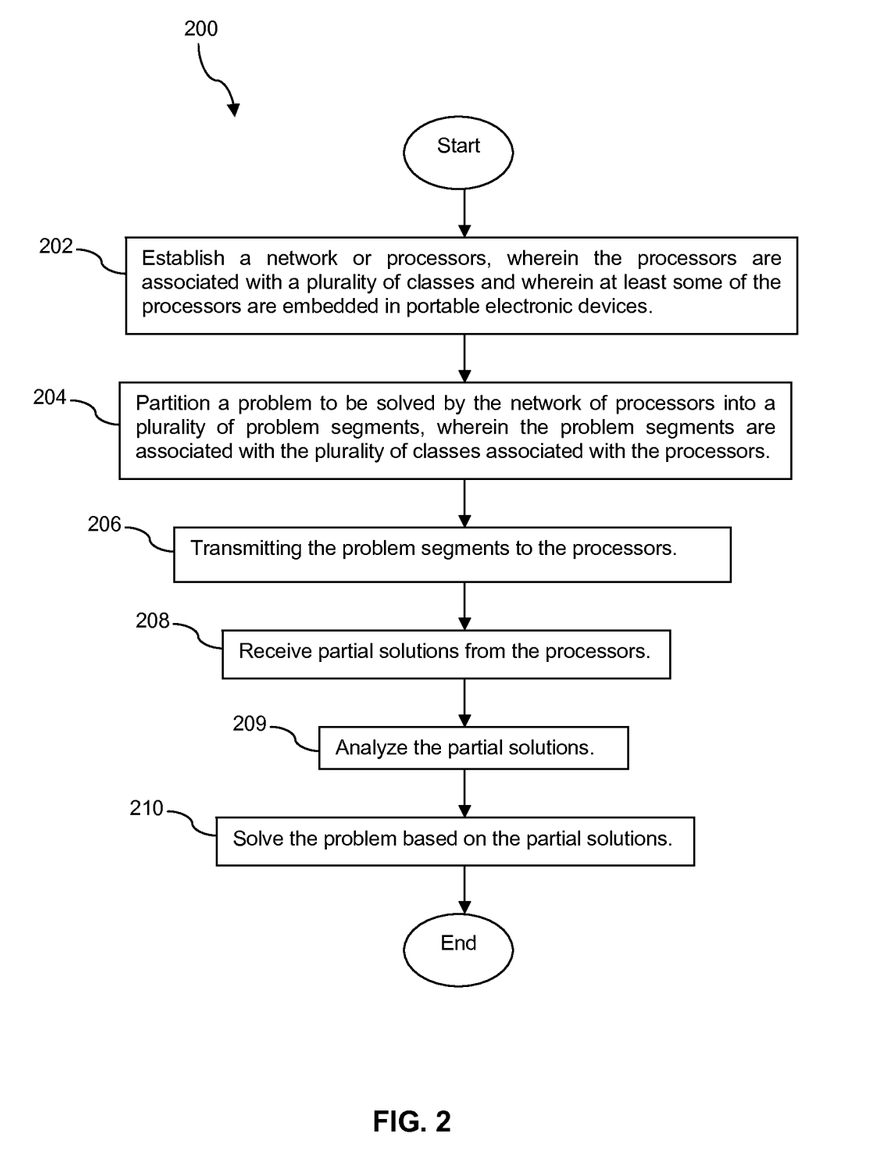
FIG. 2 is a flow chart of a method according to an embodiment of the disclosure.

Turning now to FIG. 2, a method 200 is described. At block 202, a network of processors is established, wherein the processors are associated with a plurality of classes and wherein at least some of the processors are embedded in portable electronic devices, such as portable electronic devices 120, 130. The processors may comprise the embedded processors 122, 132, 142, 144, 146. In an embodiment, a portable electronic device may be a mobile phone, a personal digital assistant, a media player, and other portable electronic devices having a wireless communication capability. The processors may be embedded in a variety of devices such as entertainment electronics, home appliances, industrial equipment, printers, copiers, facsimile machines, and other such devices. The processors may include other processors that are not embedded, for example processors in personal computers, laptop computers, notebook computers, tablet computers, and/or server computers.

At block 204, a problem to be solved by the network of processors is partitioned into a plurality of problem segments and/or particles, wherein each of the problem segments are associated with one of the processor classes. For example, five different processor classes may be defined, and the problem may be partitioned into five different types of problem segments and/or types of particles. It is understood that the plurality of problem segments associated with a single processor class may each be different from one another, in that they are solving different parts of the problem and/or comprise different data sets of the problem, but each of the problem segments may have a similar level of difficulty and/or a similar scale, such that each problem segment is sized appropriately for solution by most processors belonging to the same processor class.

At block 206, the problem segments are transmitted to the processors, for example the media access gateway 106 and/or the distribution server 102 transmits the problem segments to the processors 122, 132, 142, 144, 146. In an embodiment, transmitting the problem segments is performed while a data communication session is established by a processor and while the established data communication session is idle. Some problem segments may be transmitted regardless of whether the data communication session of the processor is idle or not, for example when the processor is not embedded in a portable electronic device 120, 130 and therefore may not need to conserve limited battery power.

At block 208, partial solutions are received from the processors. Again, the partial solutions may be transmitted by one or more processor while a data communication session is established and in an idle mode. It is understood that the processing of blocks 206 and 208 may be repeated in an iterative fashion, for example transmitting a first set of problem segments to the processors, receiving the first partial solutions and storing them in the data store 104, transmitting a second set of problem segments to the processors as they return their first partial solutions, receiving the second partial solutions and storing them in the data store 104, and continuing in like manner.

The media access gateway 106 and/or the distribution server 102 may supply each processor at its own pace, as each processor returns a partial solution, another problem segment is transmitted to them. Additionally, the media access gateway 106 and/or the distribution server 102 may supply additional problem segments and/or sub-tasks to each processor based at least in part on a utilization rate of the processor, as discussed above.

At block 209, the partial solutions and/or partial results are analyzed. This may involve collating, consolidating, correlating, and/or otherwise combining the partial solutions and/or partial results from the processors 122, 132, 142, 144, 146 to synthesize a current solution, a in-progress solution, or solution to date, depending on the character of the problem being solved and/or the task being completed. For example, analyzing data to detect evidence of intelligent extra terrestrial life may not be deemed to have completed the task or problem posed of detecting a communication from outside our solar system, though all available data may have been processed and assimilated through analyzing the partial solutions. Likewise, analyzing data to detect evidence of a proton decay event may not be deemed to have completed the task or problem posed, though all available data may have been processed and assimilated through analyzing the partial solutions. In these two examples, completing the analysis of all currently available data and synthesizing the partial results to conclude that detection of a proton decay event and/or detection of an intelligent communication originating from beyond the solar system has not occurred does not solve the problem or solve the task.

At block 210, the problem is solved based on the partial solutions and/or the task is completed based on the partial results. In an embodiment, the distribution server 102 may collect the several partial solutions provided by the network of processors and determine a solution and/or final processing result based on the partial solutions. In some cases, the distribution server 102 may be able to infer a solution before all partial solutions are provided and/or before all problem segments have been transmitted to processors and associated partial solutions received. In some cases, the task may be deemed completed based on the passage of a predetermined period of time.

Figure 3:
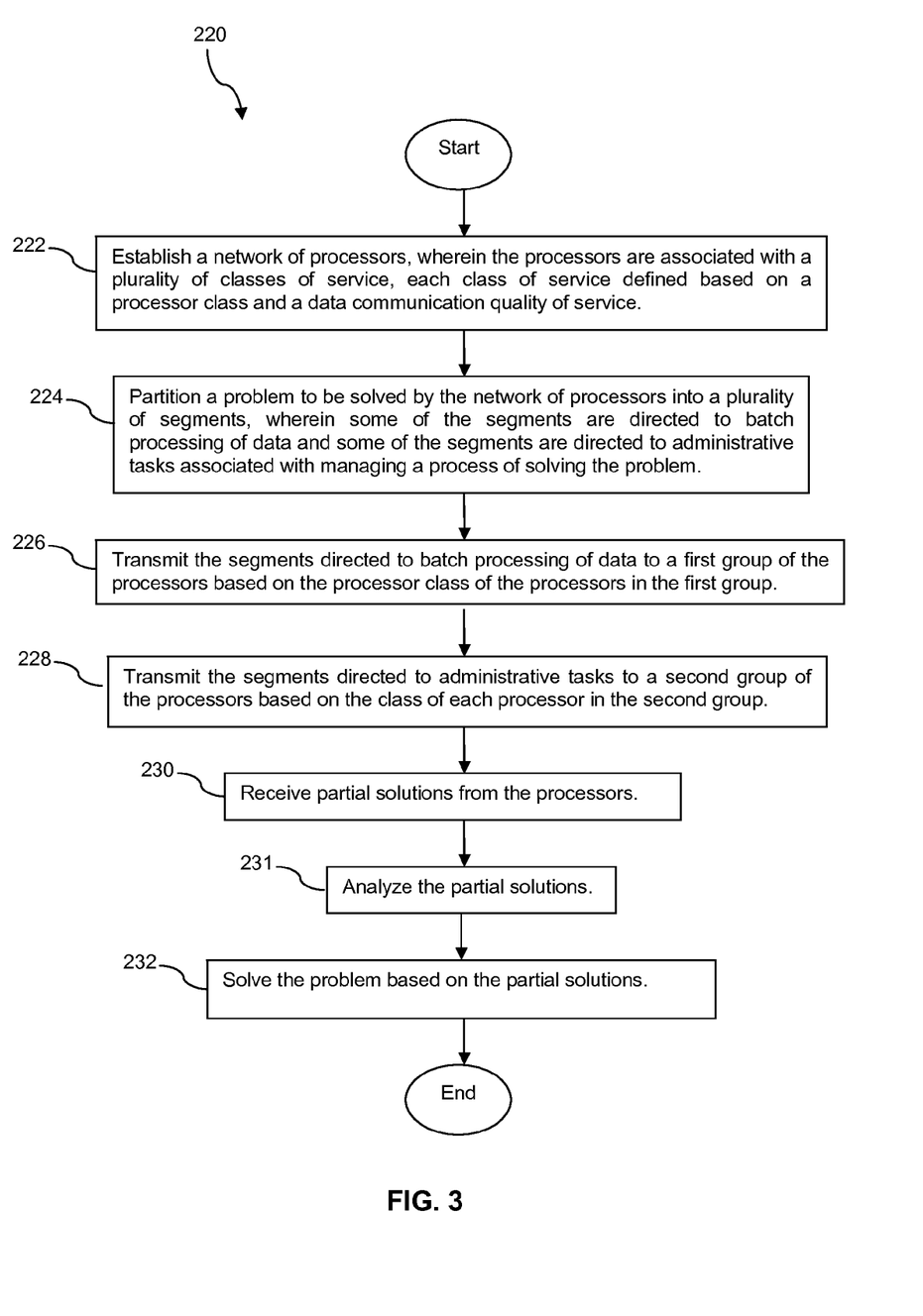
FIG. 3 is a flow chart of another method according to an embodiment of the disclosure.

Turning now to FIG. 3, a method 220 is described. At block 222, a network of processors is established, for example the embedded processors 122, 132, 142, 144, 146, wherein the processors are associated with a plurality of classes of service, each class of service defined based on a processor class and a data communication quality of service. The data communication quality of service may be based on a maximum throughput associated with a data communication protocol associated with the subject processors, a measured average throughput determined as described above, a history of communication link availability associated with the subject processors, a combination of these, and/or another communication parameter. At least some of the processors are embedded in portable electronic devices.

At block 224, a problem to be solved by the network of processors is partitioned into a plurality of segments and/or problem segments. Some of the segments are directed to batch processing of data, and some of the segments are directed to administrative tasks associated with managing the process of solving the problem. The administrative tasks may preferably be addressed by processors promptly, as general progress in problem solution may depend on these administrative tasks being completed timely. Delays in completing the batch processing of data, by contrast, may not block other processors making progress on problem segments assigned to them.

At block 226, the segments that are directed to batch processing are transmitted to a first group of processors based on the processor class of the processors in the first group. For example, processors that have a low processing speed and/or have little idle processor time may be associated with the first group. Likewise, processors that are associated with a low availability communication capability may be associated with the first group.

At block 228, the segments directed to administrative tasks are transmitted to a second group of processors based on the processor class of the processors in the second group. For example, the processors that have a high processing speed and/or have much idle processor time may be associated with the second group. Likewise, processors that are associated with high communication availability communication capability may be associated with the second group. At block 230, partial solutions are received from the first and second group of processors. The processing of blocks 228 and 230 may be repeated iteratively. At block 231, the partial solutions are analyzed, for example the several partial solutions are correlated, consolidated, combined, or otherwise used to synthesize an in-progress state of the problem solution. As discussed above, some problems may only be deemed solved by the passage of time. For example, a task that proposes detecting a previously unknown event—a proton decay event or reception of intelligent communication from beyond the solar system—may only be deemed complete after the passage of a very long period of time, though the available data may have been processed and the in-progress state of the problem solution be kept current. At block 232, the problem is solved based on the partial solutions.

Figure 4:
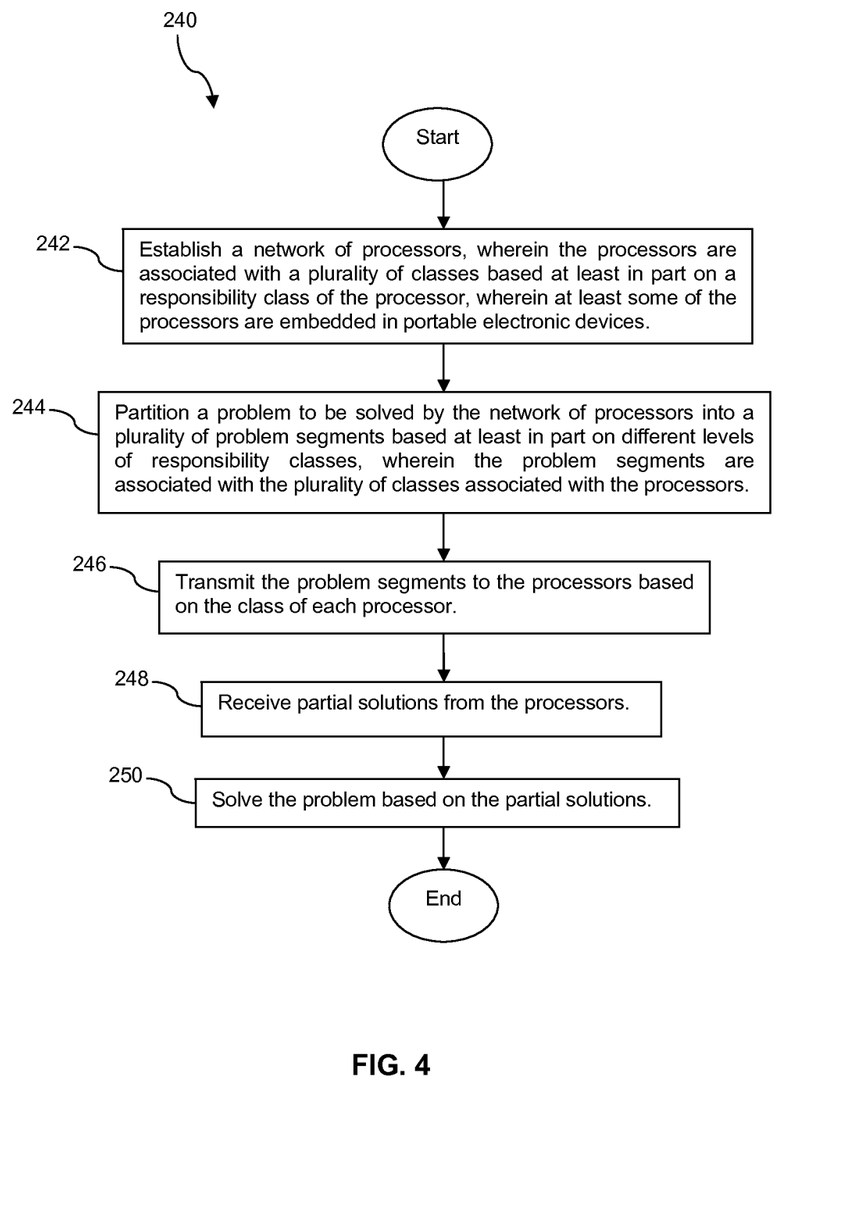
FIG. 4 is a flow chart of another method according to an embodiment of the disclosure.

Turning now to FIG. 4, a method 240 is described. At block 242, a network of processors is established, for example the embedded processors 122, 132, 142, 144, 146. The processors are associated with a plurality of classes, based at least in part on a responsibility class of the processor. At least some of the processors are embedded in portable electronic devices, for example the processors 122, 132. Other processors may be embedded in home appliances, entertainment electronics, industrial equipment, office equipment such as copiers and printers and facsimile machines, and other electro-mechanical equipment. Other processors may be located in computers such as personal computers, laptop computers, notebook computers, table computers, and server computers. At block 244, a problem to be solved by the network of processors is partitioned into a plurality of problem segments based at least in part on different levels of responsibility classes, wherein the problem segments are associated with the plurality of classes associated with the processors.

At block 246, the problem segments are transmitted to the processors based on the class of each processor. For example, the media access gateway 106 or the distribution server 102 sends problem segments to each of the processors based on the processor class associated with the problem segments and based on the processor profiles. The problem segments may be transmitted to some of the processors while a data communication session of the processors is idle, as described above. At block 248, the partial solutions are received from the processors, for example by the distribution server 102. Some of the processors may queue partial solutions waiting for a data communication session to be established and to be idle to transmit partial solutions to the distribution server 102 and/or the media access gateway 106. The processing of blocks 246 and 248 may be repeated a number of times. The media access gateway 106 and/or the distribution server 102 may feed additional problem segments to the several processors at a pace suitable to each individual processor. At block 250, the partial solutions are used to solve the problem.

Figure 5:
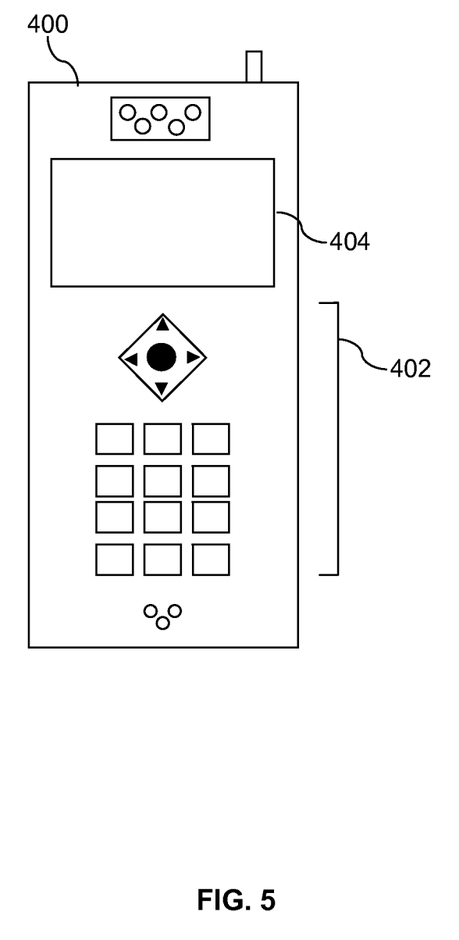
FIG. 5 is an illustration of a handset according to an embodiment of the disclosure.

FIG. 5 depicts a handset 400, for example a mobile phone, that may be used to implement the portable electronic devices 120, 130. The handset 400 includes a display 404 and a touch-sensitive surface and/or keys 402 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400. The handset 400 may execute a web browser application which enables the display 404 to show a web page. The web page may be obtained via wireless communications with the base transceiver station (BTS) 124, a wireless network access node, a peer portable electronic device 120, 130 or any other wireless communication network or system.

Figure 6:
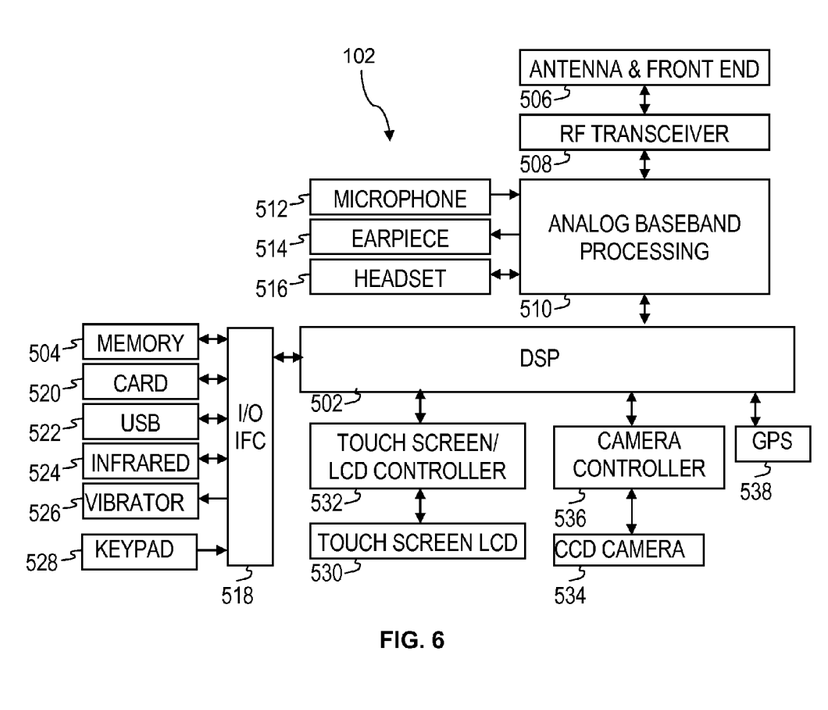
FIG. 6 is a block diagram of a portable electronic device according to an embodiment of the disclosure.

FIG. 6 shows a block diagram of the portable electronic device 120. While a variety of known components of portable electronic devices are depicted in FIG. 6, in an embodiment a subset of the listed components and/or additional components not listed may be included in the portable electronic device 120. The portable electronic device 120 includes a digital signal processor (DSP) 502 and a memory 504. As shown, the portable electronic device 120 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 120 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 120 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 120 to send and receive information from a radio access network (RAN) or some other available wireless communications network or from a peer portable electronic device 120. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 120 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 120 to function as a peripheral device to exchange information with a personal computer or other computer system. The infrared port 524 and other optional ports such as a Bluetooth interface or an IEEE 802.11 compliant wireless interface may enable the portable electronic device 120 to communicate wirelessly with other nearby handsets and/or wireless base stations.

The input/output interface 518 may further connect the DSP 502 to the vibrator 526 that, when triggered, causes the portable electronic device 120 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 120. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 120 to take digital pictures. The DSP 502 communicates with the CCD camera 534 via the camera controller 536. The GPS sensor 538 is coupled to the DSP 502 to decode global positioning system signals, thereby enabling the portable electronic device 120 to determine its position. In another embodiment, a camera operating according to a technology other than charge coupled device cameras may be employed. Various other peripherals may also be included to provide additional functions, e.g., radio and television reception.

Figure 7:
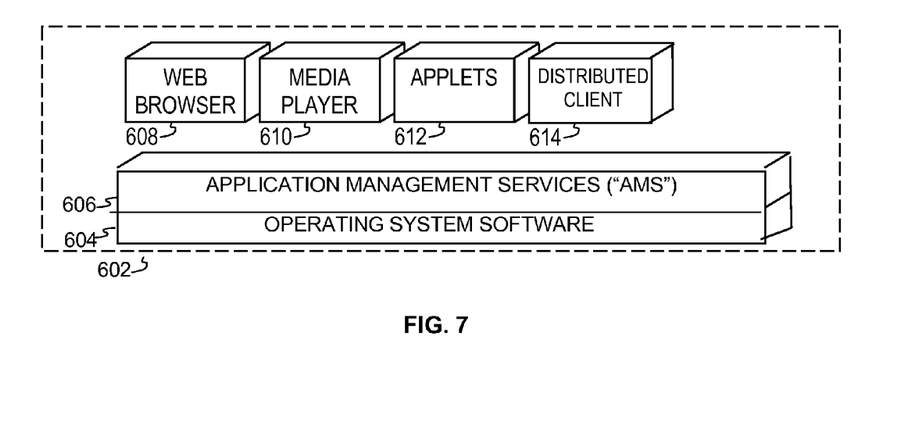
FIG. 7 is an illustration of a software architecture for a portable electronic device according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the portable electronic device 120. Also shown in FIG. 7 are a web browser application 608, a media player application 610, JAVA applets 612, and distributed client 614. The web browser application 608 configures the portable electronic device 120 to operate as a web browser, allowing a user to enter information into forms and select links to retrieve and view web pages. The media player application 610 configures the portable electronic device 120 to retrieve and play audio or audiovisual media. The JAVA applets 612 configure the portable electronic device 120 to provide games, utilities, and other functionality. The distributed client 614 corresponds to the distributed client discussed above with reference to the embedded processors 122.

Figure 8:
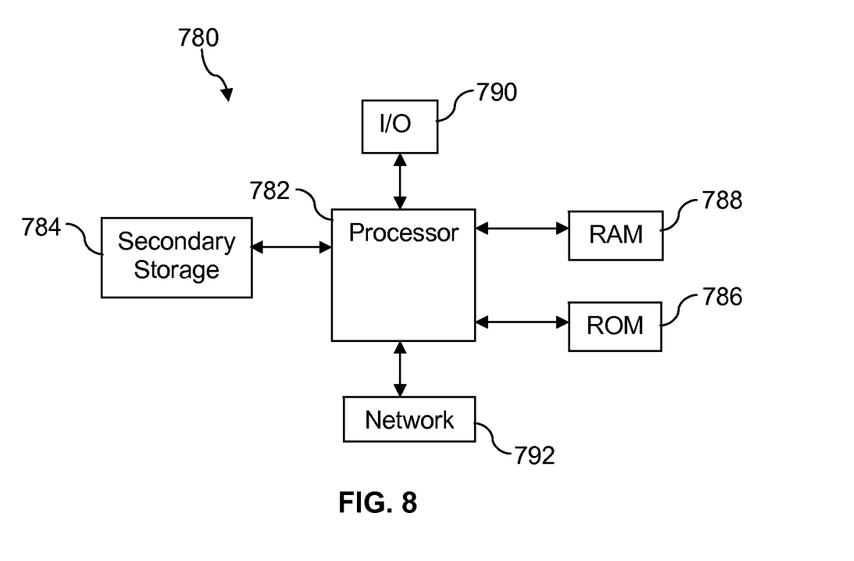
FIG. 8 illustrates an exemplary computer system suitable for implementing the several embodiments of the disclosure.

FIG. 8 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of distributed computing, comprising:
    establishing a network of processors, wherein at least some of the processors are embedded in portable electronic devices, wherein each of the processors is associated with one of a plurality of classes based on a responsibility level of the corresponding processor and at least one of a processing power of the corresponding processor and a data communication capacity of the corresponding processor, and wherein the responsibility level is based on at least one of the type of system the corresponding processor is embedded within and a response time of the corresponding processor;
    partitioning a problem to be solved by the network of processors into a plurality of problem segments, wherein each of the problem segments is associated with one of the plurality of classes associated with the processors;
    transmitting each of the problem segments to one of the processors based on the class associated with the corresponding problem segment and the class of each processor;
    receiving partial solutions from the processors; and
    analyzing the partial solutions.

2. The method of claim 1, further comprising solving the problem based on analyzing the partial solutions.

3. The method of claim 1, wherein the portable electronic devices comprise mobile phones, personal digital assistants (PDAs), and media players.

4. The method of claim 1, wherein one of the processors is embedded in one of a printer, a copier, a facsimile machine, a refrigerator, a television, a gas meter, a microwave oven, a dishwasher, a clothes washer, and a clothes dryer.

5. The method of claim 1, wherein the problem segments comprise data to be processed and instructions defining how to process the data.

6. A method of distributed computing, comprising:
    establishing a network of processors, wherein at least some of the processors are embedded in portable electronic devices, wherein each of the processors is associated with one of a plurality of classes of service, wherein each class of service is defined based on a processor class and a data communication quality of service, wherein the processor class for each of the processors is based on a responsibility level of the corresponding processor, and wherein the responsibility level is based on at least one of the type of system the corresponding processor is embedded within and a response time of the corresponding processor;
    partitioning a problem to be solved by the network of processors into a plurality of segments, wherein some of the segments are directed to batch processing of data and some of the segments are directed to administrative tasks associated with managing a process of solving the problem;

transmitting the segments directed to batch processing of data to a first group of the processors based on the processor class of the processors in the first group;

transmitting the segments directed to administrative tasks to a second group of the processors based on the processor class of each processor in the second group;

receiving partial solutions from the first and second groups of processors; and analyzing the partial solutions.

7. The method of claim 6, wherein the data communication quality of service is based on a data communication throughput of a processor and based on a history of connectivity of the processor.

8. The method of claim 7, wherein the data communication throughput is determined based at least in part on a data communication service plan associated with the processor.

9. The method of claim 7, wherein the data communication throughput is determined based on one of sending data to the processor and calculating the data communication throughput based on the length of time taken by the processor to receive the data and receiving data from the processor and calculating the data communication throughput based on the length of time taken by the processor to transmit the data.

10. The method of claim 6, wherein the segments directed to administrative tasks are transmitted to processors associated with a class of service that is associated with a highly available data connection.

11. The method of claim 6, wherein at least some of the processors are embedded in one of a mobile phone, a personal digital assistant (PDA), and a media player.

12. The method of claim 6, wherein the processor class for each of the processors is further based on a processing power of the corresponding processor.

13. A method of distributed computing, comprising:

establishing a network of processors, wherein at least some of the processors are embedded in portable electronic devices, wherein each of the processors is associated with one of a plurality of classes based at least in part on a responsibility class of the corresponding processor, and wherein the responsibility class is based on at least one of the type of system the corresponding processor is embedded within and a response time of the corresponding processor;

partitioning a problem to be solved by the network of processors into a plurality of problem segments, wherein each of the problem segments is associated with one of the plurality of classes associated with the processors;

transmitting each of the problem segments to one of the processors based on the class associated with the corresponding problem segment and the class of each processor;

receiving partial solutions from the processors; and solving the problem based on the partial solutions.

14. The method of claim 13, further comprising:

monitoring a time between transmitting a problem segment to a first processor that is a member of a high responsibility class and receiving a partial solution back from the first processor to determine a turnaround time of the first processor; and when the turnaround time exceeds a predefined threshold, delaying for a predefined period of time before transmitting another problem segment to the first processor.

15. The method of claim 13, wherein the portable electronic devices comprise at least one of a mobile phone, a personal digital assistant (PDA), and a media player.

16. The method of claim 13, wherein partitioning the problem comprises breaking the problem into small sized problem segments, medium sized segments, and large sized segments.

17. The method of claim 16, wherein small sized problem segments are transmitted to processors associated with a class based on a small processing power.

18. The method of claim 16, wherein small sized problem segments are transmitted to processors associated with a class based on a high responsibility level.

19. The method of claim 13, wherein each of the processors is associated with one of a plurality of classes based further on at least one of a processing power of the corresponding processor and a data communication capacity of the corresponding processor.

* * * * *